United States Patent
Sommer et al.

(10) Patent No.: US 7,209,513 B2
(45) Date of Patent: Apr. 24, 2007

(54) PHASE, FREQUENCY AND GAIN CHARACTERIZATION AND MITIGATION IN SCDMA BURST RECEIVER USING MULTI-PASS PROCESSING

(75) Inventors: Naftali Sommer, Rishon-Le-Zion (IL); Itay Lusky, Hod Hasharon (IL); Mor Miller, Ra'anana (IL)

(73) Assignee: Texas Instruments Incorporated, Dallas, TX (US)

( * ) Notice: Subject to any disclaimer, the term of this patent is extended or adjusted under 35 U.S.C. 154(b) by 750 days.

(21) Appl. No.: 10/437,480

(22) Filed: May 14, 2003

(65) Prior Publication Data

US 2004/0228391 A1  Nov. 18, 2004

(51) Int. Cl.
*H04B 1/69* (2006.01)
*H04L 27/06* (2006.01)
(52) U.S. Cl. ..................... 375/148; 375/316
(58) Field of Classification Search ................ 375/148, 375/130, 316, 322, 222; 370/204, 485, 498, 370/503
See application file for complete search history.

(56) References Cited

U.S. PATENT DOCUMENTS 7,020,165 B2 * 3/2006 Rakib et al. ................ 370/485

2003/0185284 A1  10/2003  Yousef et al.
2004/0037217 A1 *  2/2004  Danzig et al. .............. 370/204

FOREIGN PATENT DOCUMENTS

EP       1 235 402 A3    8/2002

* cited by examiner

*Primary Examiner*—Khai Tran
(74) *Attorney, Agent, or Firm*—Steven A. Shaw; W. James Brady; Frederick J. Telecky, Jr.

(57) ABSTRACT

A method and apparatus provide phase, frequency and gain characterization and mitigation in a synchronized code division multiple access (SCDMA) burst receiver via use of dedicated phase and frequency correction loops that implemented to deal with the unique characteristics of a SCDMA signal. The way coded and un-coded bits are interleaved within a given frame requires that all symbols related to that frame be captured in a dedicated storage medium such as a RAM prior to the beginning of the data processing. The method and apparatus substantially eliminate gain, phase, and frequency, among other impairments caused by the transmitter, channel and analog parts of the SCDMA burst receiver.

29 Claims, 11 Drawing Sheets

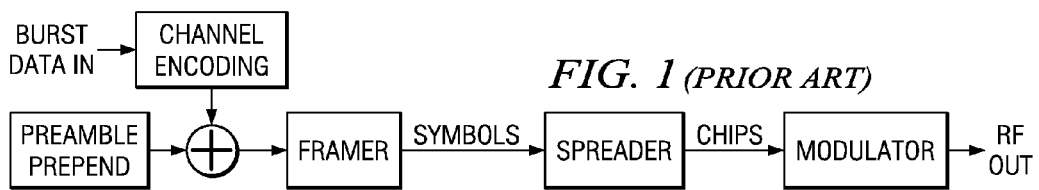
FIG. 1 (PRIOR ART)
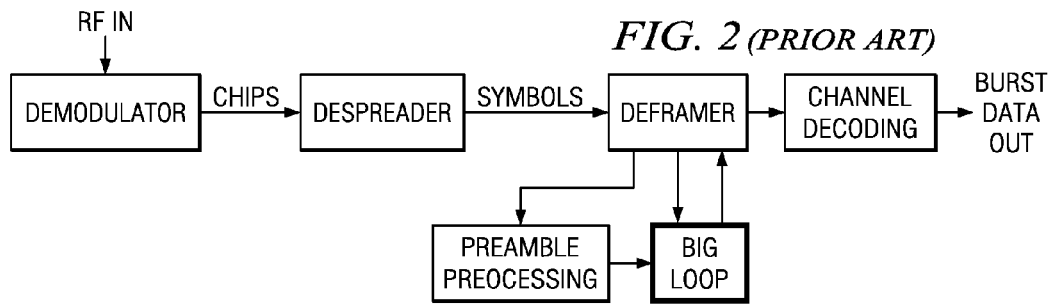
FIG. 2 (PRIOR ART)
FIG. 3 (PRIOR ART)
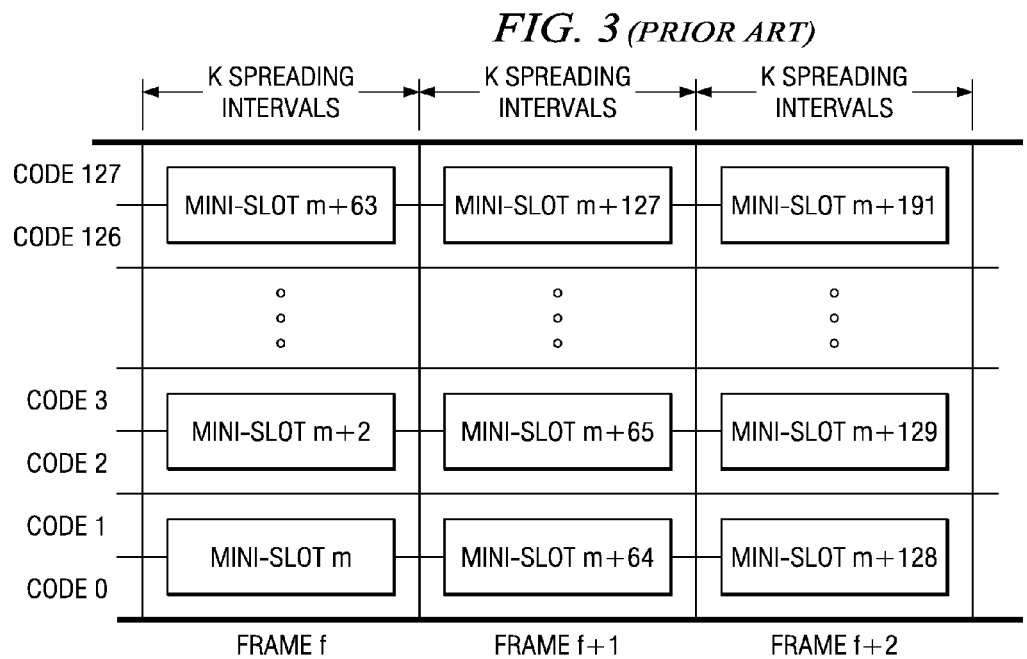

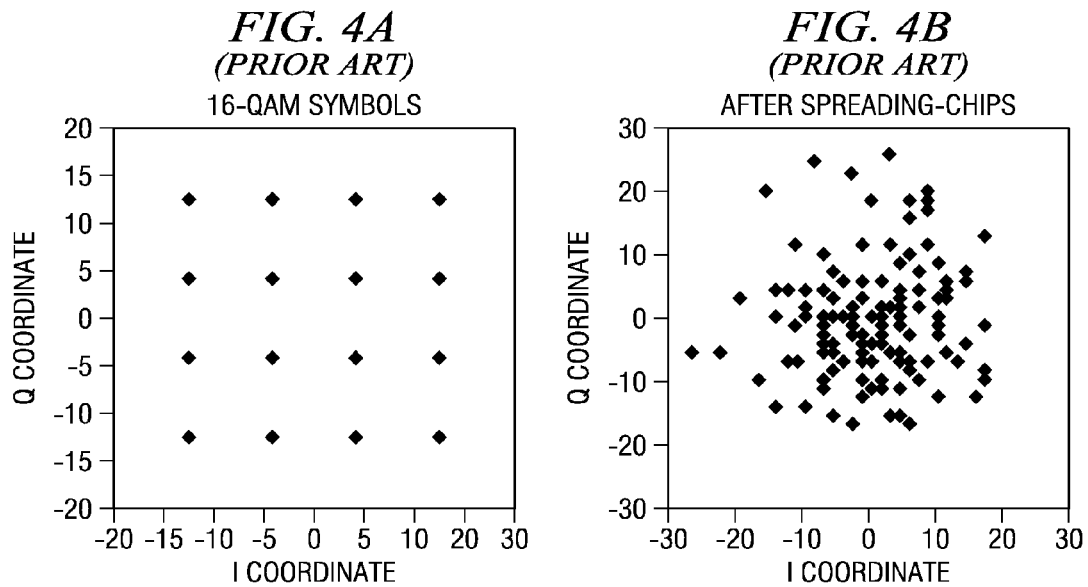
FIG. 4A (PRIOR ART) 16-QAM SYMBOLS
FIG. 4B (PRIOR ART) AFTER SPREADING-CHIPS
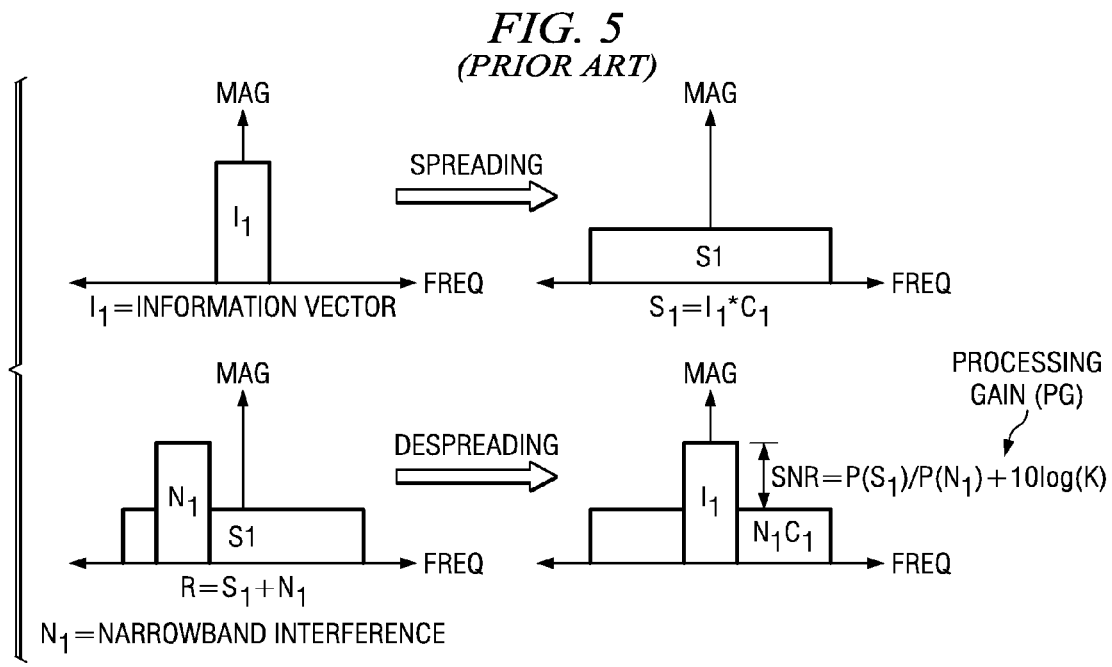
FIG. 5 (PRIOR ART)
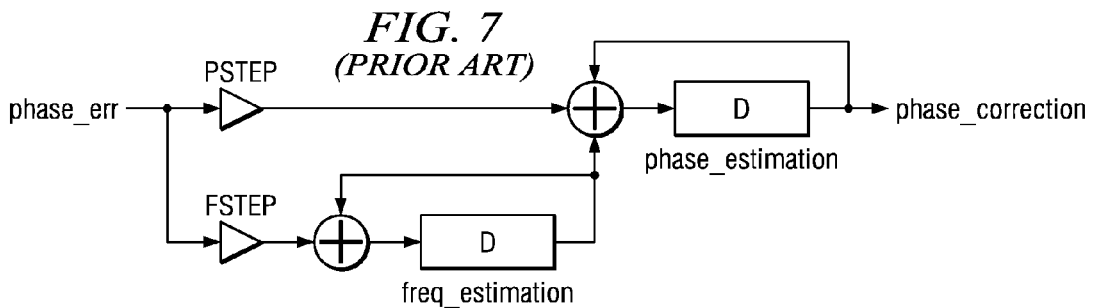
FIG. 7 (PRIOR ART)

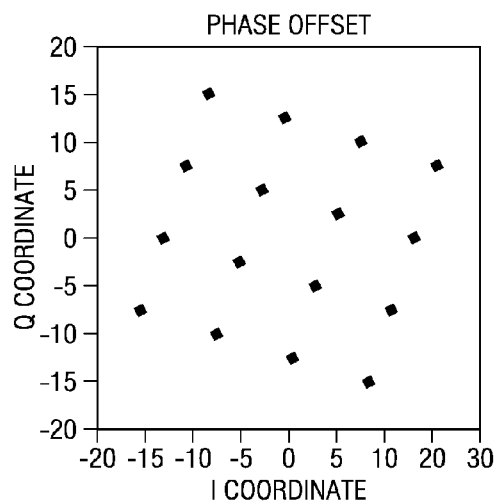
FIG. 6a *(PRIOR ART)*
PHASE OFFSET
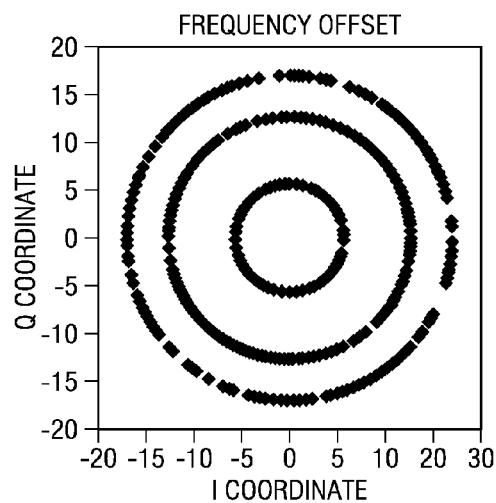
FIG. 6b *(PRIOR ART)*
FREQUENCY OFFSET
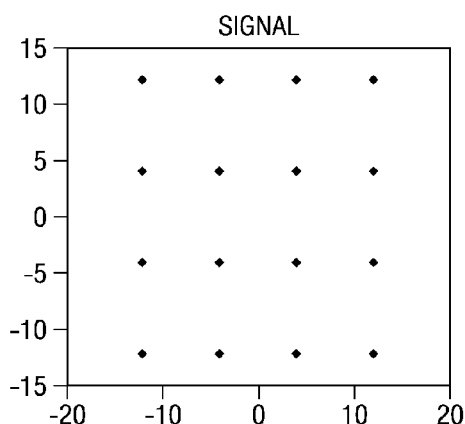
FIG. 8a *(PRIOR ART)*
SIGNAL
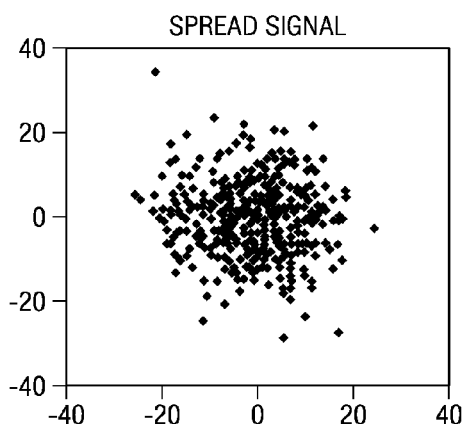
FIG. 8b *(PRIOR ART)*
SPREAD SIGNAL
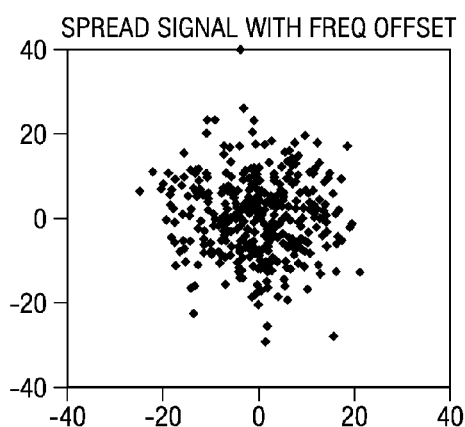
FIG. 8c *(PRIOR ART)*
SPREAD SIGNAL WITH FREQ OFFSET
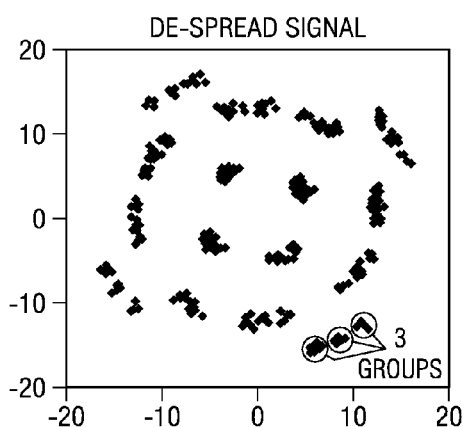
FIG. 8d *(PRIOR ART)*
DE-SPREAD SIGNAL

PHASE, FREQUENCY AND GAIN CHARACTERIZATION AND MITIGATION IN SCDMA BURST RECEIVER USING MULTI-PASS PROCESSING

BACKGROUND OF THE INVENTION

1. Field of the Invention

This invention relates generally to digital communication systems and methods, and more particularly to phase, frequency and gain characterization and mitigation in SCDMA burst receivers using multi-pass data processing.

2. Description of the Prior Art

Data-Over-Cable Service Interface Specifications (DOCSIS) is a standard for data communication over cable TV infrastructure. This standard is published by CableLabs, a North American consortium founded by members of the cable TV industry. DOCSIS 2.0 was published on Dec. 31, 2001, and includes several important modifications to the previous version, 1.1. One of the most important additions is SCDMA mode in the upstream channel, which is discussed herein below.

The cable network consists of multiple clients (CMs—Cable Modems) connected to the central station (CMTS—Cable Modem Termination System). All clients in a certain region share the same cable infrastructure (similar to sharing the radio spectrum in radio transmission).

The cable spectrum is divided into upstream (from the CM to the CMTS, in frequency range 5–42 MHz) and downstream (CMTS to CM, frequency 50 MHz and above). The more complicated part is the upstream, since there are many transmitters, which need to be synchronized in order to avoid collisions.

The physical layer implementation of the upstream receiver, in the CMTS is critical for identification, characterization and compensation of impairments, especially for burst reception applications. The physical layer is described in chapter 6 of the DOCSIS specification, and the upstream is described in sub-chapter 6.2.

Upstream channels are located in the range of 5-42MHz, as stated herein before. In that range, there can be several different channels (FDMA—Frequency Division Multiple Access). Each channel includes many CMs, which transmit short bursts (and not a continuous transmission). The bursts are multiplexed using one of 2 methods:

1. TDMA—Time Division Multiple Access—bursts are transmitted in different times, synchronized by the CMTS.
2. SCDMA—Synchronized Code Division Multiple Access—bursts from several CMs are multiplied by different sets of orthogonal codes, and transmitted simultaneously.

FIG. 1 illustrates a CM upstream transmitter; while FIG. 2 illustrates a CMTS upstream receiver.

When transmitting in SCDMA, the time line is divided into frames. Each frame has 128 rows, wherein each row corresponds to a different code. Each column in the frame is called a spreading interval. The number of spreading intervals per frame (abbreviated spif) can change, depending on the transmission parameters. FIG. 3 emphasizes the relationship between frames, codes, mini-slots and spreading intervals.

The number of cells in each frame is spif*codes_num. In each cell in the frame there is a single symbol, which is represented as a complex number, or an I-Q pair (In-phase and Quadrature, or real and imaginary parts), and matches the constellation chosen for the burst.

Each CM that wants to transmit is assigned a certain number of mini-slots. Each mini-slot consists of a number of codes in a specific frame.

Before transmitting, the frames are passed through a spreader. The spreader takes each spreading interval (a vector of 128 symbols), and multiplies it with the spreading matrix—a matrix the size of 128×128:

$$\underline{p}_k = \underline{s}_k \cdot C$$

Each row in the spreading matrix C is a code, and each entry is +1 or −1. The codes are orthogonal, so C is invertible:

$$C^{-1} = \frac{1}{128} C^t \Rightarrow \frac{1}{128} C \cdot C^t = I_{128 \times 128}$$

The $s_k$ term is a vector which contains the 128 information symbols of the k'th spreading interval.

The result of the multiplication, $p_k$, is a vector of chips. FIG. 4 shows the symbols and chips in the complex plane. Note that the symbols correspond to the chosen constellation (in this case 16-QAM), while the chips are scattered:

The chips are then transmitted sequentially. All the CMs that were allocated mini-slots in the current frame transmit their chips simultaneously; hence the chips received in the CMTS receiver are the sum of all transmitted chips.

$$\underline{p}_k^{received} = \sum_{i \in CMs} \underline{p}_k^i$$

The receiver multiplies the received chips with the inverted spreading matrix $C^t$, and restores the original transmitted symbols. This action is done in the despreader:

$$\hat{\underline{s}}_k = \frac{1}{128} \underline{p}_k^{received} \cdot C^t = \frac{1}{128} \sum_{i \in CMs} \underline{p}_k^i \cdot C^t = \frac{1}{128} \sum_{i \in CMs} \underline{s}_k^i \cdot C \cdot C^t = \sum_{i \in CMs} \underline{s}_k^i$$

Note that the resulting symbols vector $\hat{\underline{s}}_k$ is the sum of all the vectors of the transmitting CMs; but since each CM is assigned different rows, there's no collision between symbols. For example, if CM #1 is assigned codes 0 through 63, and CM #2 is assigned codes 64 through 127, then $\underline{s}_k^1$ is only non-zero in indices 0 . . . 63, and $\underline{s}_k^2$ is in indices 64 . . . 127, so there's no collision in $\hat{\underline{s}}_k$ (which is the sum of both vectors).

The basic idea behind spreading is to "spread" the signal on a larger frequency span. After despreading, the signal is back to its original from, and added narrowband interferences are "spread", as shown in FIG. 5.

Each burst begins with a set of pre-defined symbols, called a preamble. The preamble enables the receiver to obtain a rough estimation on the burst's impairments, such as gain, phase and frequency offsets, by comparing the received symbols to the known preamble symbols that were actually transmitted.

In summary explanation of the above, a high-level receiver algorithm

1. Performs down-conversion and reduces signal rate to the chips rate;
2. Despreads the chips, one spreading interval at a time;

3. Stores the symbols in the deframer, until an entire frame has arrived; and
4. For each burst in the current frame:
   a. Processes the preamble to get an initial estimate of the gain, frequency and phase offsets;
   b. Passes the burst through the big-loop for a fine track and fix of the gain, phase and frequency offsets. The "fixed" symbols are written back to the deframer's memory; and
   c. Outputs the burst for symbol de-mapping and channel decoding.

The transmitted signal is modulated over a carrier frequency. Synchronization mismatch between the transmitter and the receiver may cause phase and frequency offsets in the received signal. Unless dealt with, these offsets will cause errors in the transmission.

Phase offset causes all the received symbols to appear with a constant phase shift. Frequency offset causes the symbols to appear with a changing phase shift, as can be seen in FIG. 6.

Phase and frequency offsets are parameters that can be tracked from the received symbols, using a Phase Lock Loop (PLL). FIG. 7 shows a basic diagram of a PLL. This is a $2^{nd}$ order PLL that tracks the symbols' phase (the $2^{nd}$ order loop is required due to the existence of both frequency and phase offsets).

Without the $2^{nd}$ order loop (frequency estimation, shown in the lower part of FIG. 7), the PLL would only be able to track signals with no frequency offset. If there were a frequency offset, the PLL would be able to eliminate it, but have a constant phase error. Thus, the need for a $2^{nd}$ order loop—to estimate the frequency offset, and add it to the phase estimation.

The design of the basic PLL is based on the assumption that the symbols are entering the loop in the same order as they were transmitted. This is especially important for the frequency estimation, as we can see that the frequency correction is added to the phase estimation in every clock tick (i.e. new symbol).

When using SCDMA, the phase and frequency offsets affect the chips instead of the symbols. However, using an ordinary PLL on the chips (before despreading) is impossible, since it requires slicer decisions while the chips are scattered and does not comply with a constellation; so there's no way to estimate the phase offset of each chip.

Using a PLL after the despreader poses a new problem: the symbols are organized in frames, and are no longer serial in time. Without spreading, a frequency offset is manifested in a linear change of the phase, but after the despreader one sees a different picture:

In FIG. 8, three consecutive spreading intervals of 16-QAM symbols (a total of 3*128=384 symbols) in their original form (1), are seen after spreading (2), adding a frequency offset (3) and despreading (4). It's possible to see that the symbols after despreading no longer have a linear phase, but are divided to 3 groups, each group corresponding to a spreading interval. When comparing the phase of the symbols to the transmitted ones, one sees the picture depicted in FIG. 9.

In FIG. 9, one can see that the chips' phase after adding the frequency offset is linear, as expected, but the symbols' phase forms "steps", in which each step corresponds to a spreading interval. The average phase of the symbols in each spreading interval is similar to the average phase of the chips, but it does not change linearly. The reason one sees these steps is that each symbol in spreading interval k is a linear combination of all 128 chips of that spreading interval, and is therefore affected by all 128 different phases.

The result is groups of 128 symbols with approximately the same phase, and the phase difference between successive groups is 128×phase_offset_per_chip. This complicates the phase offset tracking since the loop needs to track an impairment 128 times larger than it should have, in case SCDMA was not used. Also, since the "adding" of a frequency offset is not a linear action (multiply each chip by a growing exponent), one cannot model the change in phase as a linear process.

In view of the foregoing, it is both desirable and advantageous to provide a mechanism for phase and frequency tracking in a SCDMA channel that overcomes the above problems. This mechanism should provide phase, frequency and gain characterization and mitigation in a SCDMA burst receiver via use of dedicated phase and frequency correction loops implemented to deal with the unique characteristics of a SCDMA signal.

SUMMARY OF THE INVENTION

DOCSIS 2.0, the new standard for cable upstream transmission, added SCDMA to the allowed modulation schemes. The present invention is directed to a scheme to provide phase, frequency and gain characterization and mitigation in a SCDMA burst receiver via use of dedicated phase and frequency correction loops implemented to deal with the unique characteristics of a SCDMA signal. The way coded and un-coded bits are interleaved within a given frame requires that all symbols related to that frame be captured in a dedicated storage medium such as a RAM prior to the beginning of the data processing. The present invention substantially eliminates gain, phase, and frequency mismatch, among other impairments caused by the transmitter, channel and analog parts of the SCDMA burst receiver.

Since the incoming SCDMA burst receiver data is saved in a frame, multiple passes can be performed on the data. The first pass can be used to produce initial characterization of the phase, frequency and gain offsets affecting the incoming signal; where the second pass can be used to more accurately estimate those impairments (using a smaller step size in a LMS algorithm), and compensate for those impairments.

According to one embodiment, multiple passes are performed on the received sequence. The first pass can be used to achieve a good characterization of the various impairments; and the last pass would use the information obtained from previous passes to properly correct the impairments. Each pass may be performed column-wise or row-wise. By performing the pass column-wise, all the symbols related to the same spreading interval are analyzed sequentially, resulting in higher capability to characterize phase offset. By performing the pass row-wise, each symbol is related to a different spreading interval that was transmitted in a different time, resulting in higher capability to characterize frequency offset.

As used herein, the following terms have the following meanings:

FDMA means Frequency Division Multiple Access.

TDMA means Time Division Multiple Access.

SCDMA means Synchronized Code Division Multiple Access.

Burst means a data batch that's transmitted from a single CM.

Frame means a 2-dimensonal array of symbols. Each column corresponds to a single spreading interval. Each row corresponds to a single code. There are 128 rows (codes) per frame, and a variable number of columns (spreading intervals).

Spreading interval means a vector of symbols which are processed simultaneously in the spreader/despreader. Each spreading interval is a single column in a frame.

Symbol means a complex number representing a certain number of bits. Each symbol is composed of an 'I' value (real part) and a 'Q' value (imaginary part).

Chip means the basic data unit of a spread signal. Each spreading interval contains 128 symbols before spreading, which turn into 128 chips after despreading.

CM means Cable Modem.

CMTS means Cable Modem Termination System.

SPIF means Spreading Intervals per Frame.

PLL means Phase Lock Loop, used for tracking a changing signal.

fstep means Frequency step.

pstep means Phase step.

MSE means Mean Square Error.

BRIEF DESCRIPTION OF THE DRAWINGS

Other aspects and features of the present invention and many of the attendant advantages of the present invention will be readily appreciated as the invention becomes better understood by reference to the following detailed description when considered in connection with the accompanying drawing figures thereof and wherein:

FIG. 1 is a block diagram illustrating a CM upstream transmitter;

FIG. 2 is a block diagram illustrating a CMTS upstream receiver;

FIG. 3 is a diagram illustrating frames, codes, mini-slots and spreading intervals in which there are 2 codes per mini-slot;

FIG. 4 compares symbols and chips in a complex plane;

FIG. 5 is a pictorial illustrating signal spreading and dispreading to help deal with narrowband noise;

FIG. 6 is a pair of plots illustrating phase and frequency offsets in a 16-QAM constellation;

FIG. 7 illustrates a standard PLL for phase tracking;

FIG. 8 shows a series of plots illustrating the effect of frequency offset in S-CDMA;

While the above-identified drawing figures set forth particular embodiments, other embodiments of the present invention are also contemplated, as noted in the discussion. In all cases, this disclosure presents illustrated embodiments of the present invention by way of representation and not limitation. Numerous other modifications and embodiments can be devised by those skilled in the art which fall within the scope and spirit of the principles of this invention.

DETAILED DESCRIPTION OF THE PREFERRED EMBODIMENTS

Figure 10:
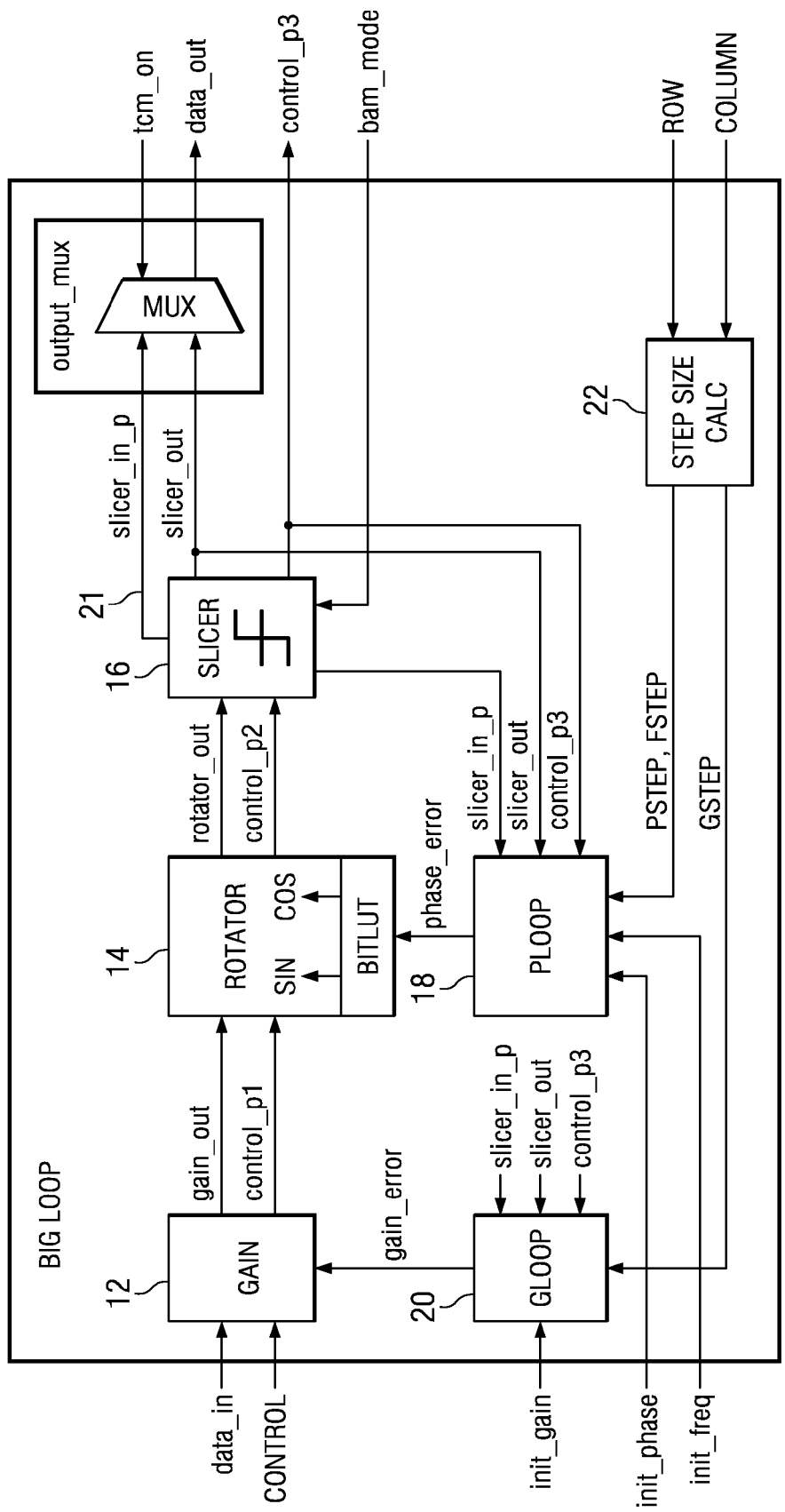
FIG. 10 illustrates a big-loop module for a CMTS upstream receiver.

FIG. 10 illustrates a big-loop 10 for a CMTS upstream receiver. The modules in the big-loop 10 can be seen to include a Gain module 12 that adjusts the symbols' gain, a Rotator module 14 that adjusts the symbols' phase, and a Slicer module 16 that performs hard-decision slicing of the symbols, according to the specified constellation (qam_mode). The slicer's input, discussed herein below, is regarded as soft-decision data. Other modules in the big-loop 10 also include a Ploop (Phase-loop) module 18 for tracking phase and frequency offsets, a Gloop (Gain-loop) module 20 for tracking gain offsets, and a Step-size-calc module 22 that calculates the step sizes for the various loops.

The goal of the ploop module 18 is to estimate the phase offset affecting the incoming signal, and use it to predict the rotation angle needed to correct this impairment. The ploop module 18 inputs are the slicer module 16 outputs (hard-decision) and input (soft-decision). The slicer module 16 processing time is 1 clock cycle. Therefore, in order to synchronize both signals, the slicer module 16 input is delayed by one cycle as well, calling it slicer_in_p (enumerated 21, and where p indicates pipeline).

The ploop module 18 then uses its inputs to determine the symbol's phase offset, and uses this data to estimate the phase offset needed for the symbol now entering the Rotator module 14. This estimate (called phase_error) 24 is passed to the Rotator module 14. The Rotator module 14 employs a lookup table (sin_lut) to calculate necessary sine and cosine values for rotating the symbol. Due to hardware considerations, each module has its own processing delay as shown in Table I.

TABLE I

| Module | Delay (clock cycles) |
| --- | --- |
| Gain | 2 |
| Rotator | 1 |
| Sin_lut | 1 |
| Slicer | 1 |
| Ploop | 1 |
| Gloop | 1 |

Control signals shown in FIG. 10 (grouped for convenience under the signal name control) are pipelined through the different modules, so their timing matches the symbols. The naming convention for these pipelined signals is shown in Table II.

TABLE II

| Delay (clock cycles) | Name |
| --- | --- |
| 0 | control |
| 1 | control_p |
| 2 | control_p1 |

TABLE II-continued

| Delay (clock cycles) | Name |
|---|---|
| 3 | control_p2 |
| 4 | control_p3 |

As described herein before, when the big-loop 10 starts its operation, the frame had already passed the despreader (shown in FIG. 2) and is located in the deframer's memory (also shown in FIG. 2), and an initial gain, phase and frequency offsets estimation for the current burst was already performed. Since the data is not sequential (the big-loop 10 has access to the entire frame), it can now be processed "offline", in any order as desired (as long as the processing is completed before the next frame arrives). Several processing paradigms that use this advantage are described herein below in order to provide a better understanding of the preferred embodiments.

Two Passes

Each frame is passed through the big-loop 10 twice. In the first pass, the goal is to "train" the loop 10 by tracking the phase and frequency offsets of the burst, without writing the corrected symbols back to the deframer. This allows the loop to train on the entire burst before making any changes. In the second pass, smaller learning factors are taken (to reduce loop jitter), and the symbols will be changed according to the trained loop.

Passing by Rows or Columns

Figure 11A:
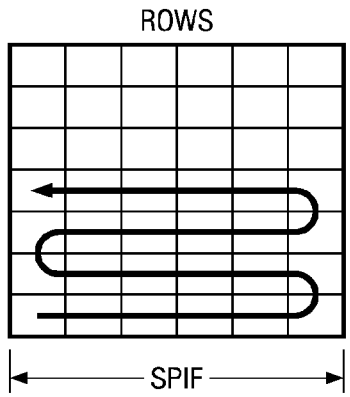
FIG. 11a illustrates passing symbols to a PLL row after row.
Figure 11B:
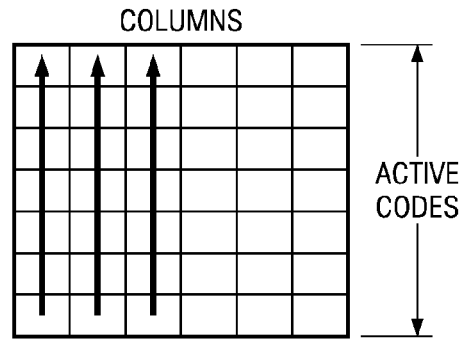
FIG. 11b illustrates passing symbols to a PLL column after column.

In a conventional PLL, symbols entering the loop are chronologically sequential. In the present case, the symbols are arranged in a 2-dimensional frame. Each column (spreading interval) contains symbols transmitted in the same time (and hence has approximately the same phase offset, see FIG. 9). There are 2 options for passing the symbols to the loop (as illustrated in FIGS. 11a and 11b):

1. Rows pass—Pass the symbols to the loop 10 row after row, while maintaining a one spreading interval distance between sequential symbols. In this method, each two sequential symbols have a phase difference between them (except at the end of the rows).

2. Columns pass—Pass the symbols to the loop 10 column after column.

In order to estimate the frequency offset, it is necessary to look at symbols that differ in phase as a result of the frequency offset (i.e. symbols from different spreading intervals). In rows pass, almost every two successive symbols have this difference, while in columns pass, this difference is seen only once per spreading interval. Hence, better frequency convergence can be expected when using rows pass.

On the other hand, since in columns pass there are less frequency "events", better phase convergence can be expected.

Frequency Update in Columns Pass

As stated herein before, when using a columns pass, the effect of a frequency offset is only felt once per spreading interval. Therefore, there can be two approaches towards the $2^{nd}$ order of the ploop 18 (the frequency offset):

1. The conventional PLL approach—update the $2^{nd}$ order (i.e. the frequency correction accumulator) each time a new symbol arrives.

2. Update the $2^{nd}$ order only in a "frequency event" i.e. when we pass from one column to the next. According to this approach, symbols in the same column are not affected by a frequency offset, and so only the $1^{st}$ order of the loop is needed. At the end of each column, check the total change of the $1^{st}$ order over the column (by comparing the phase accumulator at the end and beginning of the column). This change is the frequency error, which will be taken into account when updating the frequency accumulator.

Loop Delay

The phase loop (rotator-slicer-ploop-sin_lut-rotator) shown in FIG. 10 has a total delay of 4 clock cycles as can be seen with reference to Table I. This means that the symbols in the ploop's input and output may be up to 4 symbols apart (dependent on the rate the symbols are sent to the big-loop). They might be in different rows, or different columns, and the ploop 18 must take that into consideration.

Figure 12:
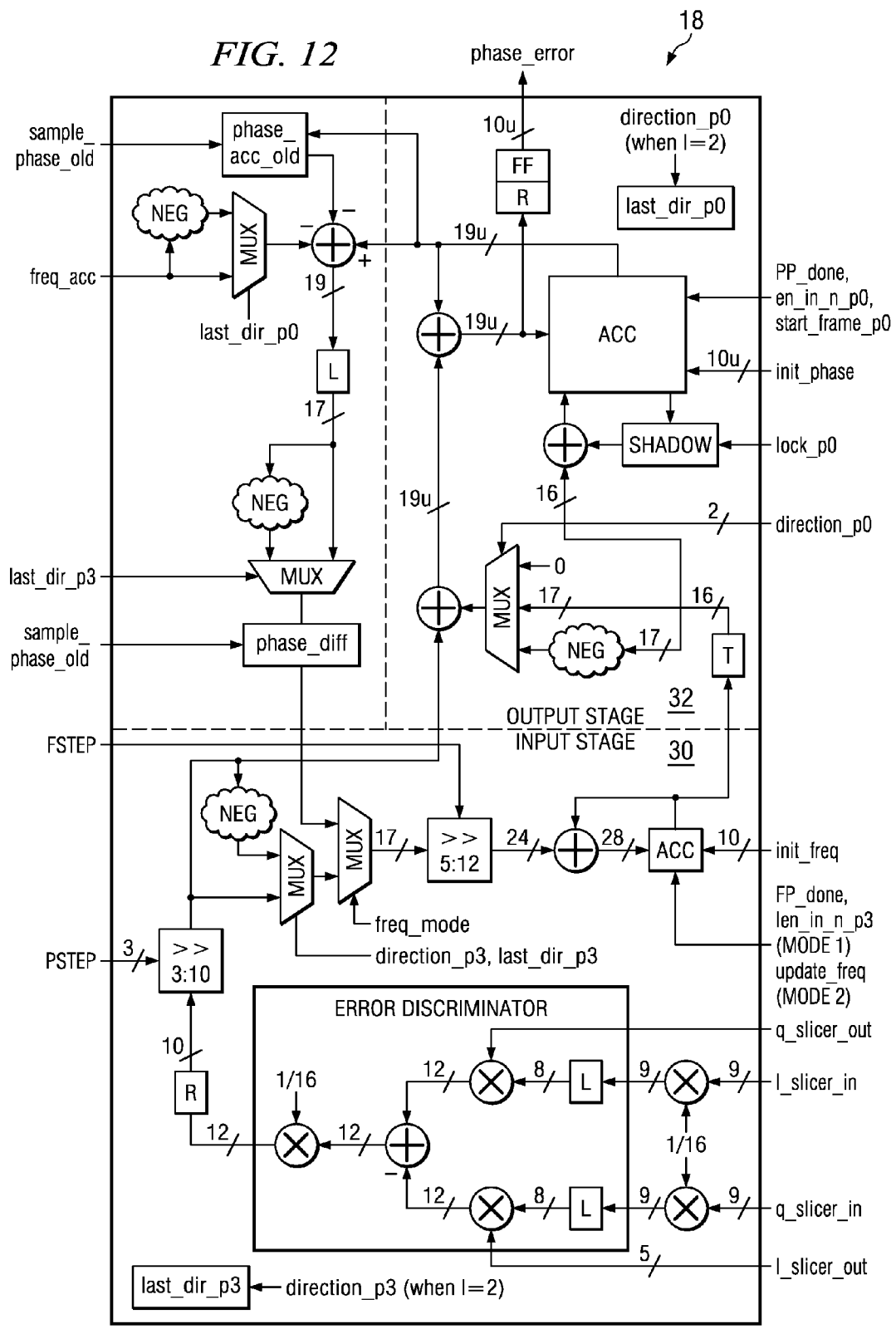
FIG. 12 is a more detailed diagram illustrating the phase loop portion of the big-loop shown in FIG. 10.

The result is a division of the ploop 18 into 2 stages as shown in FIG. 12.

1. An input stage 30, which needs to be synchronized with the symbols at the input of the ploop (i.e. slicer output), thus using control signal control_p3.

2. An output stage 32, which needs to be synchronized with the symbol entering the rotator (p1), while taking into consideration the delay of the sin_lut (1 cycle) and the ploop itself (1 cycle), thus using control signal control.

The timing difference between the inputs of the input and output stages 30, 32 (control and control_p3) is 4 clock cycles—the total delay of the loop.

A detailed description directed to one embodiment of a loop is now presented herein below in view of the basic processing paradigms discussed herein above, which are the heart of the invention. In order to enhance clarity, this detailed description is divided into sections describing each component of the loop.

Fixed-Point Values

Figure 13:
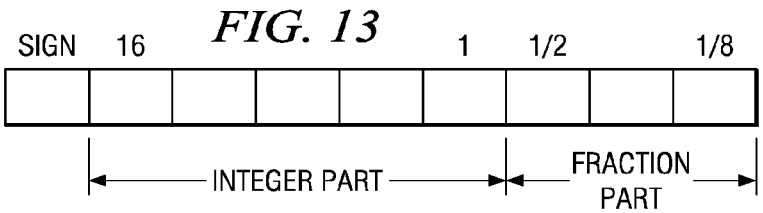
FIG. 13 is a diagram illustrating a fixed-point representation for signals passed to the phase loop shown in FIG. 12.

All values are passed in fixed-point representation, and as such have two important parameters—the bus width (in bits) and the max-level. For example, the value q_slicer_in is 9-bit with max-level of 32. This means that it's represented as shown in FIG. 13. Unsigned values are marked with the letter u (for example, the value phase_acc). This means that there's no sign bit. Limiters are marked with the letter L. These components are used when it is desired to limit the max-level of the incoming signal. If the value in the limiter's input is higher than the limiter's defined max-level, it will be truncated to the maximal allowed value (when using signed values; the same applies for values lower than the min-level). Truncaters are marked with the letter T. This is not really a component, but simply means dropping some least-significant bits, to reduce precision. Rounders are marked with the letter R. These components are used when it is desired to reduce the precision of a value in a more accurate way. Instead of truncating the value, the value is rounded.

Error Discriminator

Figure 14:
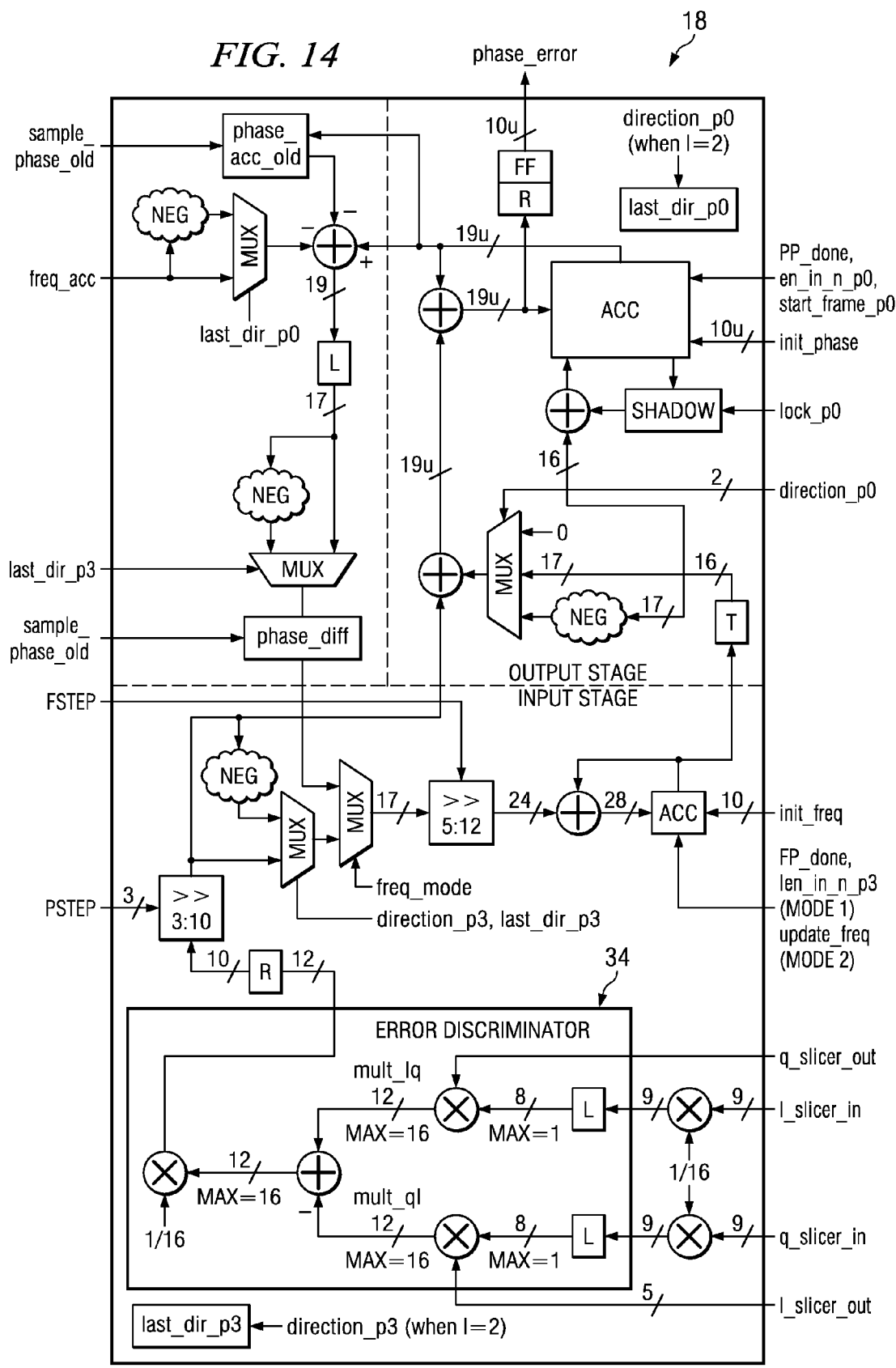
FIG. 14 highlights the error discriminator portion of the phase loop shown in FIG. 12.

The Error Discriminator 34 portion of the phase loop module 10 (depicted in FIG. 14) is responsible for determining the phase error, by comparing the symbols before and after slicing. The phase error is approximated the following way:

$$\text{phase\_error} =$$
$$= \text{Re}(\text{sym\_in}) \cdot \text{Im}(\text{sym\_out}) - \text{Im}(\text{sym\_in}) \cdot \text{Re}(\text{sym\_out}) =$$
$$= \text{Im}(\text{sym\_in} \cdot \text{sym\_out}^*) =$$

-continued $$= \text{Im}(r_{in} \cdot r_{out} \cdot e^{j(\theta_{in}-\theta_{out})}) =$$

$$= r_{in} \cdot r_{out} \cdot \sin(\theta_{in} - \theta_{out}) \cong$$

$$\cong r_{in} \cdot r_{out} \cdot (\theta_{in} - \theta_{out})$$

where sym_in and sym_out represent the symbol in the slicer's input and output respectively (reminder—i_slicer_in is the real value of the symbol in slicer_in, and q_slicer_in is its imaginary value).

The phase error is multiplied by constant factors (called step sizes) along the way, in order to reduce noise effect (much like a conventional PLL). Actually, since all the constant factors are powers of 2, multipliers are not utilized, and the only effect of the multiplication is the change in the max-level of the fixed-point values.

Accumulators' Step Sizes

Figure 15:
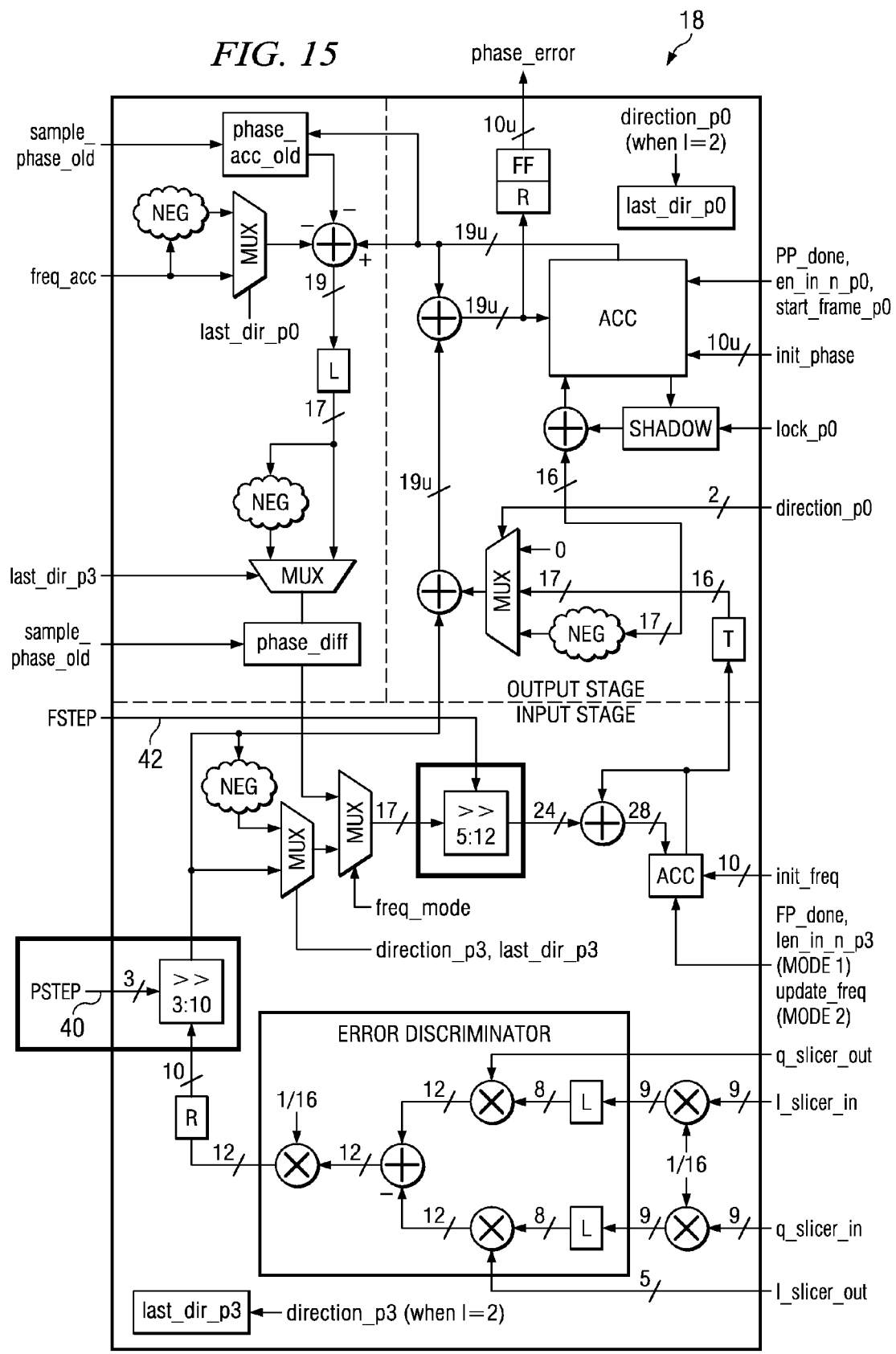
FIG. 15 highlights the pstep and fstep portions of the phase loop shown in FIG. 12.

The step sizes 40, 42, shown in FIG. 15, determine the loop's rate of convergence. A large step will result in faster convergence, but bigger steady-state jitter. Small steps reduce the jitter but converge slower. These trade-offs are analyzed in greater detail herein below. Two step-sizes are used in the ploop 18:
  pstep—Step size for the phase accumulator. The phase error is multiplied by pstep before entering the accumulator.
  fstep—Step size for the frequency accumulator. Actually, the real step size is pstep*fstep, since the phase error is multiplied by both factors before entering the frequency accumulator.

Like the constants in the error discriminator 34, fstep and pstep are powers of 2, so the multiplication is simply a bitwise shift. Since a columns pass generates fewer "frequency events" than a rows pass, it is expected that a larger fstep will be needed in order to compensate.

Frequency Accumulator

Figure 16:
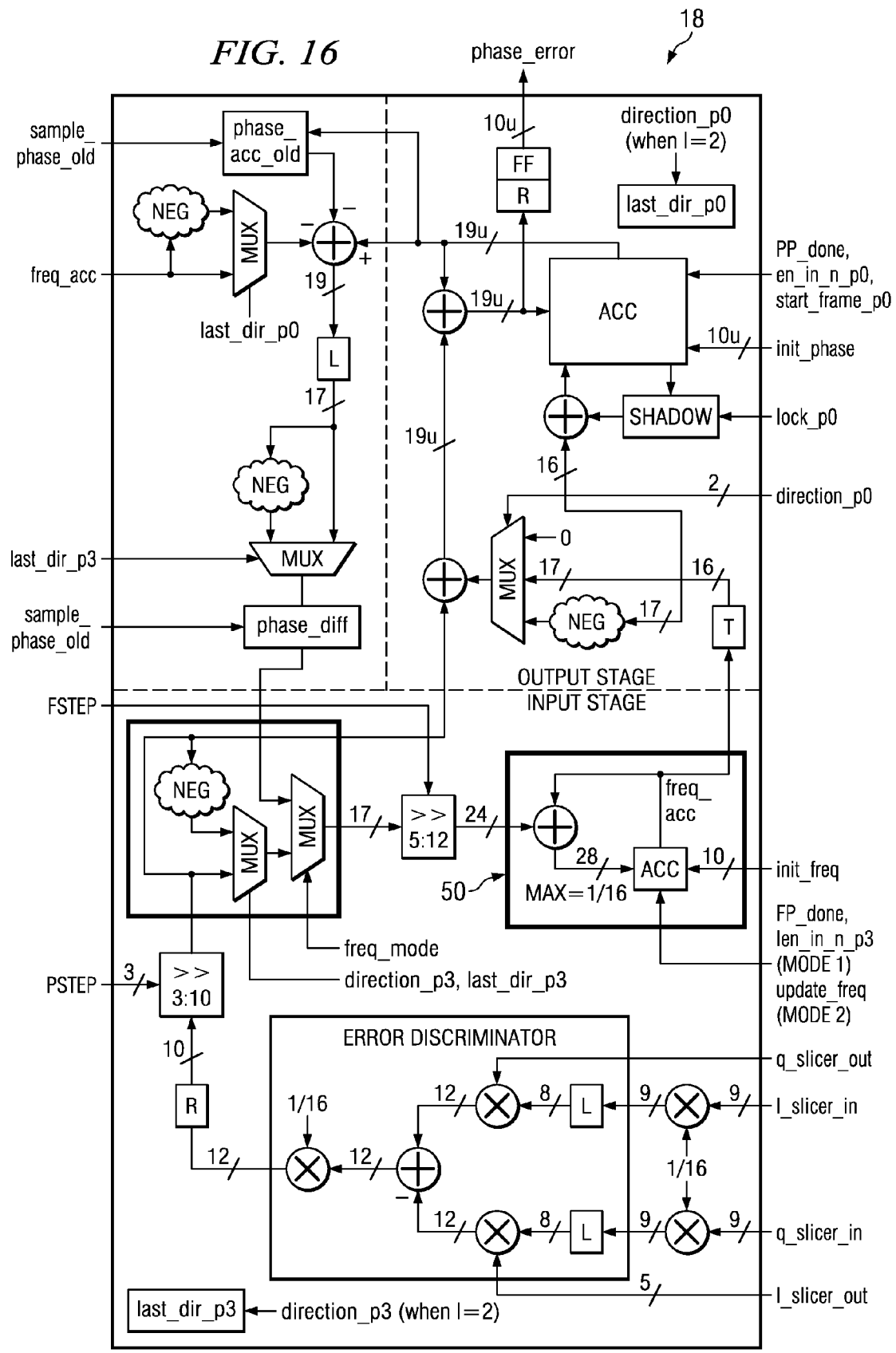
FIG. 16 highlights the frequency accumulator portion of the phase loop shown in FIG. 12.

The frequency accumulator 50, identified in FIG. 16, is the heart of the $2^{nd}$ order loop, responsible for frequency offset estimation. After multiplying the estimated phase error by the fstep 42, the result (signal acc_add_freq) is entered into the accumulator (i.e. added to the previous value). The value at the accumulator's output is called freq_acc. The sign of the phase error is determined by the direction of the last sideways movement (change of spreading intervals).

Phase Accumulator

Figure 17:
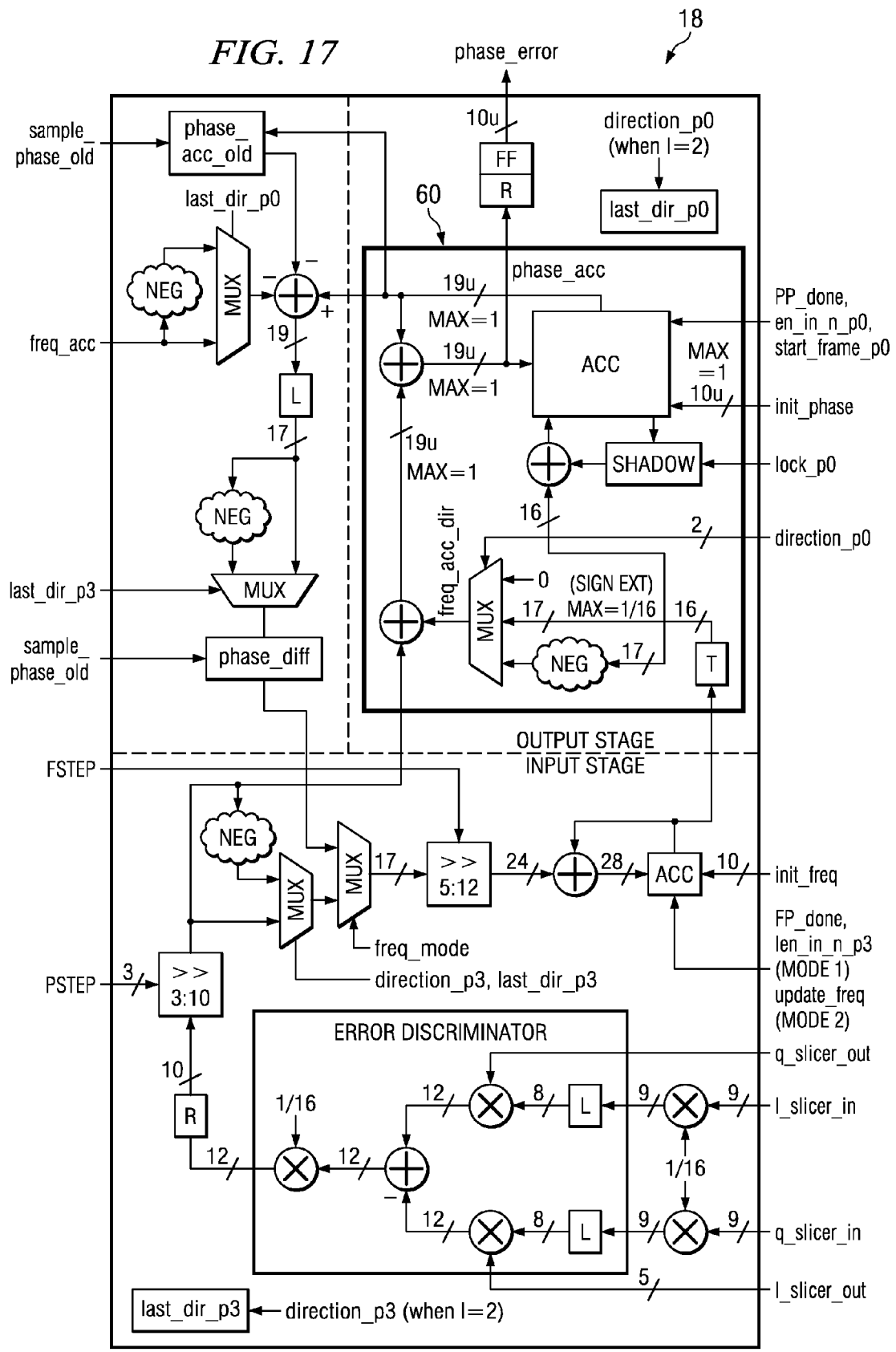
FIG. 17 highlights the phase accumulator portion of the phase loop shown in FIG. 12.

The phase accumulator 60, identified in FIG. 17, accumulates the value of the last phase error, plus (or minus) the frequency estimation (freq_acc). The sign of freq_acc is determined by the movement direction in the frame as seen in FIG. 11, as follows:
  Right movement—moving from one spreading interval to the next one—add freq_acc.
  Left movement—moving from one spreading interval to the previous one—subtract freq_acc.
  Up/down movement—staying in the same spreading interval—don't use freq_acc.

Figure 9:
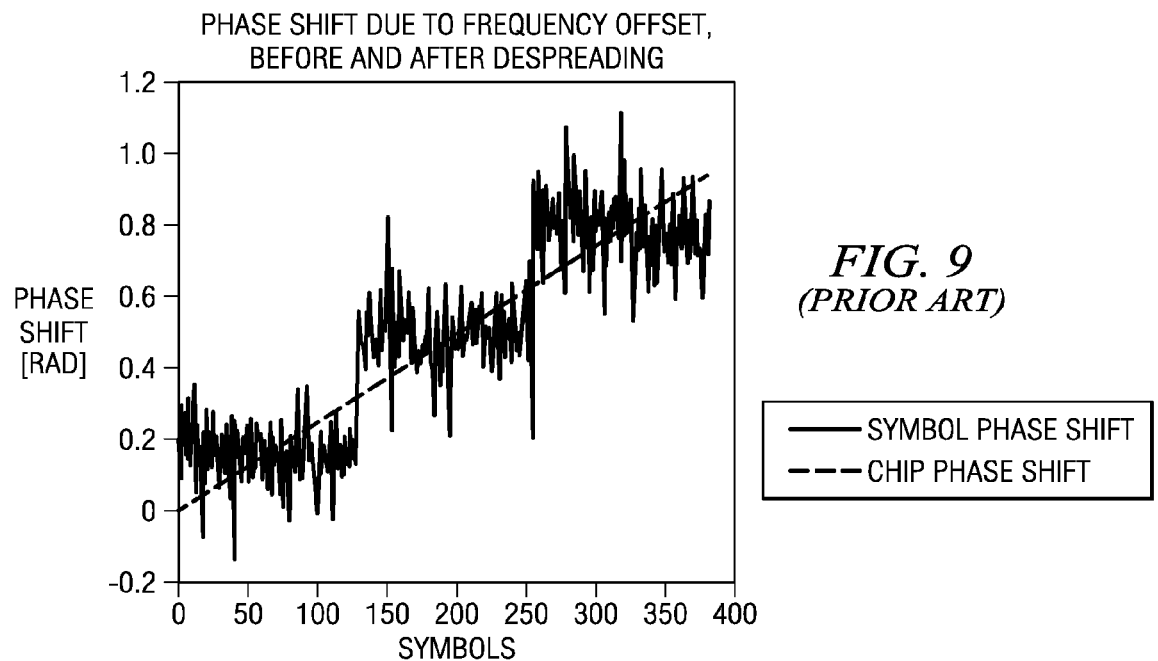
FIG. 9 is a plot illustrating a phase shift due to frequency offset, before dispreading (chips) and after (symbols)

The reason for this policy is simple—freq_acc is an estimation of the height of the "stairs" (as seen in FIG. 9), i.e. estimation of the phase offset between consecutive spreading intervals. Right movement can be seen as going up the stairs (adding that phase offset), and left movement as going down the stairs (subtracting that phase offset). The movement direction is indicated by control signal direction_p0 (note that control signal direction_p0 is a p0 signal, with timing that matches the output stage of the loop).

Phase Difference Calculation

Figure 18:
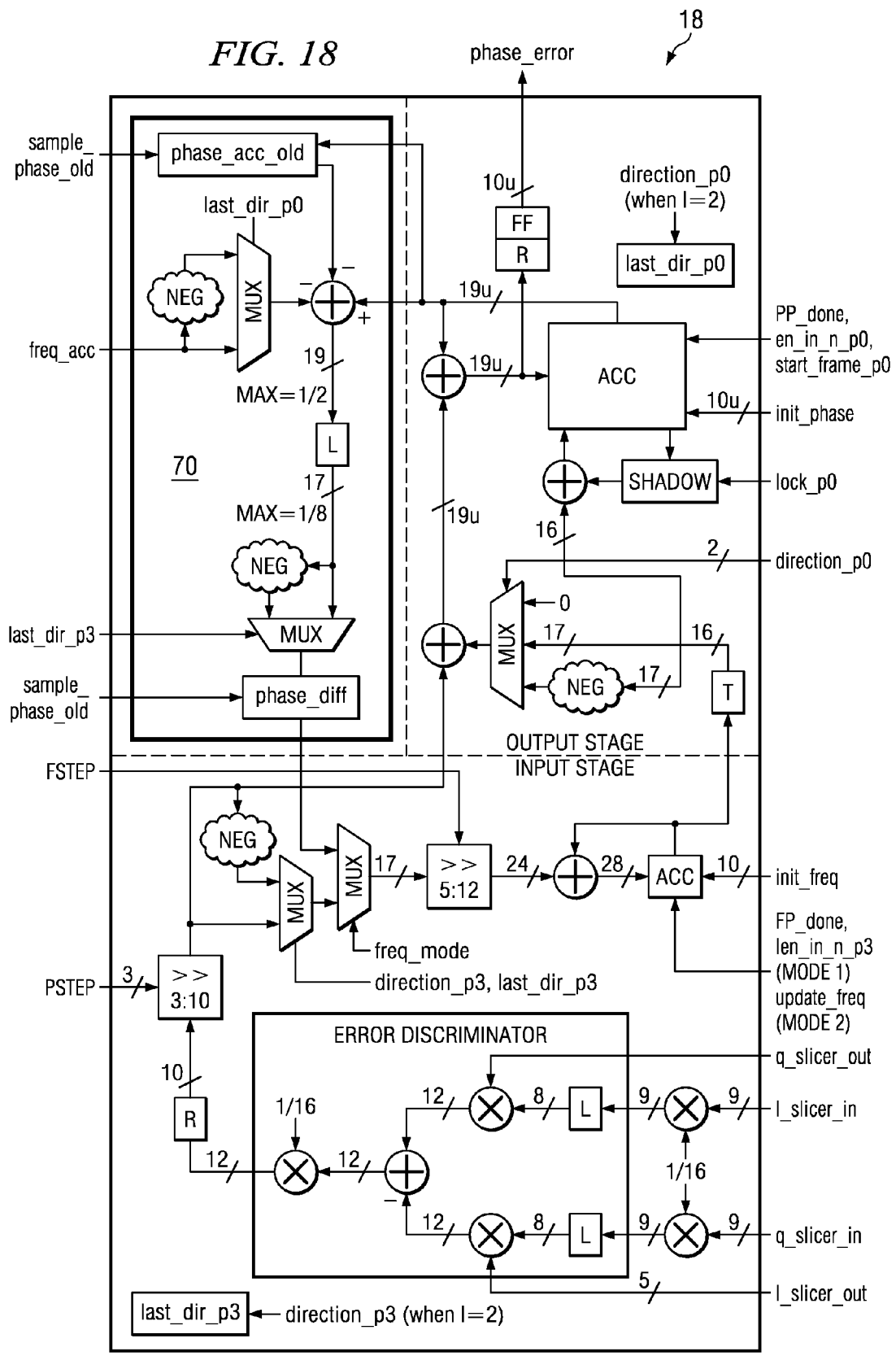
FIG. 18 highlights the phase difference calculation engine portion of the phase loop shown in FIG. 12.

When updating the $2^{nd}$ order only in a "frequency event" such as discussed herein before (frequency update), it is necessary to calculate the difference in phase between consecutive spreading intervals. This phase difference calculation sub-module 70, identified in FIG. 18, achieves that by sampling the phase accumulator every time the column changes, and subtracting the previously sampled value. After subtracting the estimated frequency offset, a frequency correction (signal phase_diff) is fed into the frequency accumulator. The moment of sampling is determined by the control signal sample_phase_old, which goes active when the input stage switches from one column to the next. Note that this section contains feedback from the output stage to the input stage, and uses control signals from both timing schemes. When subtracting freq_acc, the last direction change in the output stage (last_dir_p0) is taken into consideration; but when determining the sign of phase_diff, the last direction change in the input stage (last_dir_p3) is used.

Control Signals

As stated herein before, the control signals, described herein below, come with 2 different timing delays, for the input and output stages, and marked p3 and p0 respectively, where
  control signal PP_done indicates that the preamble processing is finished, and the initial values of the phase and frequency offset can be sampled;
  control signal en_in_n is active when a new symbol is available at either input (p3) or output (p0) stage;
  control signal direction is a family of signals that indicates the relative horizontal position of the current symbol relative to the previous one. Possible values are 0, 1 or 2, which indicate right, left or no horizontal movement, respectively;
  control signal lock is active on the rightmost (last) column of the current frame. When this signal is active, the phase accumulator is sampled into a shadow register, to be used in the beginning of the next frame (in case the burst spans over more than one frame)
  control signal start_frame indicates the beginning of a new frame in the current burst. When this signal is active, the value of the shadow phase register is sampled into the phase accumulator; and control signal freq_mode states whether the frequency accumulator should work in mode A or B discussed herein before.

In view of the above, it can be seen the present invention present a significant advancement in the characterization and mitigation of impairments associated with SCDMA burst receivers. It should be apparent that the present invention represents a significant departure from the prior art in construction and operation. However, while particular embodiments of the present invention have been described herein in detail, it is to be understood that various alterations, modifications and substitutions can be made therein without departing in any way from the spirit and scope of the present invention, as defined in the claims which follow.

What is claimed is:

1. A method of providing signal characterization and mitigation in a SCDMA burst receiver, the method comprising the steps of:
  storing in a data storage device, all incoming symbols related to a single frame;

processing the stored symbols to initially characterize at least one input signal impairment selected from the group consisting of phase offset, frequency offset, and gain offset;

processing the at least one initially characterized signal impairment based on a desired potentially reduced step size to more accurately characterize the at least one signal impairment; and providing input signal impairment compensation in response to the more accurately characterized at least one signal impairment.

2. The method according to claim 1, wherein the processing is selectively implemented in a column-wise fashion, such that all symbols related to the same spreading interval are analyzed sequentially, to characterize the phase offset.

3. The method according to claim 1, wherein the processing is selectively implemented in a column-wise fashion, such that all symbols related to the same spreading interval are analyzed sequentially, to characterize the frequency offset.

4. The method according to claim 1, wherein the processing is selectively implemented in a row-wise fashion, such that each symbol is related to a different spreading interval transmitted at a different time, to characterize the frequency offset.

5. The method according to claim 1, wherein the processing is selectively implemented in a row-wise fashion, such that each symbol is related to a different spreading interval transmitted at a different time, to characterize the phase offset.

6. The method according to claim 1, wherein the processing is implemented via processing spreading intervals from left to right in a frame to advance in time for each successive data pass.

7. The method according to claim 1, wherein the processing is implemented via processing spreading intervals from right to left in a frame to go backward in time for each successive data pass.

8. The method according to claim 1, wherein the processing is implemented via processing symbols transmitted continuously in time.

9. The method according to claim 8, wherein the processing of symbols transmitted continuously in time comprises processing the symbols in a given frame column after column.

10. The method according to claim 9, wherein the processing of symbols in a given frame column after column comprises processing the symbols from left to right or from right to left.

11. The method according to claim 8, wherein the processing of symbols transmitted continuously in time comprises processing the symbols in a given frame row after row.

12. The method according to claim 11, wherein the processing of symbols in a given frame row after row comprises processing the symbols in even rows from left to right and in odd rows from right to left.

13. The method according to claim 11, wherein the processing of symbols in a given frame row after row comprises processing the symbols in even rows from right to left and in odd rows from left to right.

14. A method of providing signal characterization and mitigation in a SCDMA burst receiver, the method comprising the steps of:

storing in a data storage device, all incoming symbols related to a single frame;

performing multiple processing passes upon the stored data such that a first pass characterizes at least one signal impairment, and further such that a second pass more accurately characterizes the at least one signal impairment in response to a desired step size that is potentially smaller than a step size associated with the first pass; and correcting the more accurately characterized at least one signal impairment.

15. The method according to claim 14, wherein the desired step size is updated only once per spreading interval.

16. The method according to claim 14, wherein the desired step size is updated on a symbol basis.

17. The method according to claim 14, wherein the at least one signal impairment is selected from the group consisting of phase offset, frequency offset, and gain offset.

18. A SCDMA burst receiver comprising:

a demodulator operational to receive SCDMA input signals and generate chips there from;

a despreader operational to process the chips and generate symbols there from;

a deframer operational to store the symbols until an entire frame has been received;

a preamble processing engine operational to process a set of pre-defined symbols and generate initial estimates of at least one input signal impairment;

a signal-processing loop operational to process the symbols stored in the deframer and the initial estimate of the at least one input signal impairment to characterize the least one input signal impairment using multiple passes and a potentially reduced step size to more accurately characterize the at least one signal impairment, and cause the deframer to store compensated symbol data there from; and a channel decoder operational to decode the compensated symbol data and generate burst data out there from.

19. The SCDMA burst receiver according to claim 18, wherein the signal-processing loop comprises:

a gain module operational to adjust symbol gain;

a rotator module operational to adjust symbol phase;

a slicer module operational to perform hard-decision slicing of symbols, according to a specified constellation;

a phase-loop operational to track symbol phase and frequency offsets;

a gain-loop operational to track symbol gain offsets; and a step-size calculation engine operational to calculate phase and frequency step-sizes for the phase-loop and gain step sizes for the gain loop.

20. The SCDMA burst receiver according to claim 19, wherein the phase-loop comprises:

an error discriminator operational to estimate symbol phase error by comparing symbols before and after slicing;

a frequency accumulator operational to estimate symbol frequency offset in response to the estimated symbol phase error and the frequency step-size;

a phase accumulator operational to selectively accumulate the value of the last estimated symbol phase error and the estimated symbol frequency offset; and a phase difference calculation engine, operational to selectively calculate the phase difference between consecutive spreading intervals and to generate a frequency accumulator correction signal there from.

21. The SCDMA burst receiver according to claim 20 wherein the phase difference calculation engine is further operational to generate the frequency accumulator correction signal each time a new symbol arrives.

22. The SCDMA burst receiver according to claim 20 wherein the phase difference calculation engine is further operational to generate the frequency accumulator correction signal when passing from one column to the next while calculating the phase difference between consecutive spreading intervals.

23. The SCDMA burst receiver according to claim 19, wherein the phase-loop comprises:
   an input stage synchronized with the symbols at the input of the phase-loop; and
   an output stage synchronized with the symbol entering the rotator module, such that the synchronized input stage and the synchronized output stage together operate to synchronize control signals associated with the phase-loop.

24. A SCDMA burst receiver comprising:
   means for receiving SCDMA input signals and generating chips there from;
   means for despreading the chips and generating symbols there from;
   means for storing the symbols until an entire frame has been received;
   means for processing preamble symbols and generating initial estimates of at least one input signal impairment there from;
   means for processing the stored symbols and the initial estimates of the at least one input signal impairment to characterize the least one input signal impairment using multiple passes and a potentially reduced step size to more accurately characterize the at least one signal impairment, and generating compensated symbol data there from; and
   means for decoding the compensated symbol data and generating burst data there from.

25. The SCDMA burst receiver according to claim 24, wherein the means for processing the stored symbols and the initial estimates of the at least one input signal impairment, and generating compensated symbol data there from, comprises:
   means for adjusting symbol gain;
   means for adjusting symbol phase;
   means for performing hard-decision slicing of symbols, according to a specified constellation;
   means for tracking symbol phase and frequency offsets;
   means for tracking symbol gain offsets; and
   means for calculating phase and frequency step-sizes for the phase and frequency offset tracking means and the gain offset tracking means respectively.

26. The SCDMA burst receiver according to claim 25, wherein the means for tracking symbol phase and frequency offsets comprises:
   means for estimating symbol phase error by comparing symbols before and after slicing;
   means for estimating symbol frequency offset in response to the estimated symbol phase error and the frequency step-size;
   means for selectively accumulating the value of the last estimated symbol phase error and the estimated symbol frequency offset; and
   means for selectively calculating the phase difference between consecutive spreading intervals and for generating a frequency accumulator correction signal there from.

27. The SCDMA burst receiver according to claim 26 wherein the means for selectively calculating the phase difference between consecutive spreading intervals is further operational to generate the frequency accumulator correction signal each time a new symbol arrives.

28. The SCDMA burst receiver according to claim 26 wherein the means for selectively calculating the phase difference between consecutive spreading intervals is further operational to generate the frequency accumulator correction signal when passing from one column to the next while calculating the phase difference between consecutive spreading intervals.

29. The SCDMA burst receiver according to claim 25, wherein the means for tracking symbol phase and frequency offsets comprises:
   an input stage synchronized with input symbols associated with the means for tracking symbol phase and frequency offset; and
   an output stage synchronized with an input symbol associated with the means for adjusting symbol phase, such that the synchronized input stage and the synchronized output stage together operate to synchronize control signals associated with the means for tracking symbol phase and frequency offset.

* * * * *